(12) United States Patent
Oishi

(10) Patent No.: US 11,718,206 B2
(45) Date of Patent: Aug. 8, 2023

(54) SEAT RECLINING APPARATUS AND METHOD FOR MANUFACTURING SEAT RECLINING APPARATUS

(71) Applicant: TF-METAL Co., Ltd., Kosai (JP)

(72) Inventor: Kunihisa Oishi, Hamamatsu (JP)

(73) Assignee: TF-METAL Co., Ltd., Kosai (JP)

( * ) Notice: Subject to any disclaimer, the term of this patent is extended or adjusted under 35 U.S.C. 154(b) by 0 days.

(21) Appl. No.: 17/452,443

(22) Filed: Oct. 27, 2021

(65) Prior Publication Data
US 2022/0133042 A1    May 5, 2022

(30) Foreign Application Priority Data
Oct. 29, 2020  (JP) ................. 2020-181004

(51) Int. Cl.
| | | |
|---|---|---|
| *B60N 2/22* | (2006.01) | |
| *B60N 2/23* | (2006.01) | |
| *B60N 2/235* | (2006.01) | |
| *B60N 2/225* | (2006.01) | |
| *A47C 1/025* | (2006.01) | |
| *B60N 2/20* | (2006.01) | |
| *A47C 1/024* | (2006.01) | |

(52) U.S. Cl.
CPC .......... *B60N 2/2213* (2013.01); *B60N 2/2252* (2013.01); *B60N 2/2254* (2013.01); *B60N 2/2356* (2013.01); *A47C 1/025* (2013.01); *A47C 1/0242* (2013.01); *B60N 2/20* (2013.01)

(58) Field of Classification Search
CPC .. B60N 2/2252; B60N 2/2254; B60N 2/2255; B60N 2/2213; B60N 2/236; B60N 2/2362; B60N 2/2218; B60N 2/2356
See application file for complete search history.

(56) References Cited

U.S. PATENT DOCUMENTS

| | | | |
|---|---|---|---|
| 10,941,837 B2 * | 3/2021 | Sakurai | F16H 3/44 |
| 2009/0184554 A1 * | 7/2009 | Paing | B60N 2/167 |
| | | | 417/313 |
| 2009/0273218 A1 * | 11/2009 | Park | B60N 2/168 |
| | | | 297/284.6 |
| 2012/0025586 A1 * | 2/2012 | Legras | B60N 2/2255 |
| | | | 16/337 |

(Continued)

FOREIGN PATENT DOCUMENTS

JP    2013-94375 A    5/2013

*Primary Examiner* — Timothy J Brindley
(74) *Attorney, Agent, or Firm* — Foley & Lardner LLP

(57) ABSTRACT

A drive bush configured to circumferentially rotate and drive a pair of wedge members in an eccentric space includes a cylindrical portion rotatably supported inside a boss portion of an internal tooth constituting member, a flange portion integrally formed at a first end portion in the axial direction of the cylindrical portion so as to face one side surface side of the wedge members, and a pushing portion integrally provided on the outer peripheral side of the flange portion, and configured to release a wedge effect by circumferentially pushing the wedge members. The inner surface of the cylindrical portion is integrally formed with a wall portion, and the wall portion is formed with, in the middle thereof, a female spline teeth meshing with the output shaft of a motor. The cylindrical portion, the wall portion including the female spline teeth and the flange portion have substantially the same thickness.

4 Claims, 7 Drawing Sheets

(56) References Cited

U.S. PATENT DOCUMENTS

| | | | |
|---|---|---|---|
| 2013/0106161 A1 | 5/2013 | Ohba et al. | |
| 2014/0097659 A1* | 4/2014 | Wahls | A47C 1/025 297/362 |
| 2015/0291063 A1* | 10/2015 | Enokijima | A47C 1/025 297/361.1 |
| 2022/0104621 A1* | 4/2022 | Hur | B60N 2/2356 |

* cited by examiner

SEAT RECLINING APPARATUS AND METHOD FOR MANUFACTURING SEAT RECLINING APPARATUS

BACKGROUND

The present invention relates to a seat reclining apparatus capable of adjusting the angle position of a seat back to a seat cushion mounted on a vehicle, and to a method for manufacturing the seat reclining apparatus.

As an example of this type of the seat reclining apparatus, one described in Japanese Patent Application Publication No. 2013-094375 (hereinafter is referred to as "JP 2013-094375 A") has been know.

This seat reclining apparatus is provided with: an internal tooth constituting member formed by half blanking from the axial direction so as to have, on the annular inner peripheral surface thereof, a plurality of internal teeth; an external tooth constituting member having, on the annular outer peripheral surface thereof, a plurality of external teeth whose number of the teeth is smaller by one or two than the number of teeth of the internal teeth of the internal tooth constituting member; a cylindrical boss portion integrally formed at the hole edge of the center hole of the internal tooth constituting member; and a large diameter hole formed on the inner side of the external tooth constituting member and having a diameter larger than the outer diameter of the boss portion. In addition, in a state in which the internal teeth mesh with the external teeth, a pair of wedge members are disposed in an eccentric space formed between the inner peripheral surface of the large diameter hole and the outer peripheral surface of the boss portion, and a drive member for circumferentially pushing the wedge members in the eccentric space is provided.

This drive member is provided with: a cylindrical portion rotatably disposed inside the boss portion; a flange portion integrally provided to one end portion in the axial direction of the cylindrical portion so as to cover a side surface of each of the wedge members; and a pushing portion integrally provided on the outer peripheral side of the cylindrical portion so as to release a wedge effect by circumferentially pushing each of the wedge members.

Then, in the drive member, rotation drive force is transmitted from an electric motor via a female spline hole formed on the inner peripheral surface of the cylindrical portion along the axial direction, and when the pushing portion makes each of the wedge members one rotation with the rotation drive force, the engagement of the internal teeth and the external teeth is changed by the difference between the number of teeth of the internal teeth and the number of teeth of the external teeth, the relative rotational angle of the internal tooth constituting member and the external tooth constituting member is displaced, and consequently, the angle position of the seat back is displaced.

SUMMARY

Here, in the seat reclining apparatus of JP 2013-094375 A, the female spline hole (female spline teeth) formed at the cylindrical portion of the drive member is formed over the full length in the axial direction of the inner peripheral surface of the cylindrical portion. In case where the female spline teeth are formed by, for example, punching with press forming, the female spline teeth are formed such that the length in the axial direction of the female spline teeth becomes long. In the axially long female spline teeth, substantially a half of the female spline teeth in the axial direction is formed with high accuracy, and the remaining half thereof becomes a broken surface.

Therefore, this remaining half thereof does not contribute to the transmission of the rotation drive force. In other words, when taking into consideration the magnitude of the rotation drive force from the electric motor, it is no necessary to form the female spline teeth to the whole length of the cylindrical portion, and therefore useless working is performed or useless shapes is formed.

The present invention is one for solving at least a part of the above problem, and an object of the present invention is to provide a seat reclining apparatus in which a wall portion having substantially the same thickness as a flange portion is integrally provided to the inner periphery of a distal end portion of the cylindrical portion in a drive member, and by forming internal teeth to the wall portion, useless working or the formation of useless shapes can be suppressed.

A seat reclining apparatus of the present invention includes: an internal tooth constituting member having, on an annular inner peripheral surface thereof, a plurality of internal teeth formed by half blanking in an axial direction thereof; an external tooth constituting member having, on an annular outer peripheral surface thereof, a plurality of external teeth which mesh with the internal teeth of the internal tooth constituting member, and whose number of teeth is smaller by one or two than that of teeth of the internal teeth; a cylindrical boss portion provided to one of the internal tooth constituting member and the external tooth constituting member; a large diameter hole having an inner peripheral surface which has an inner diameter larger than an outer diameter of an outer peripheral surface of the boss portion and into which the boss portion is inserted, the large diameter hole being provided to an other of the internal tooth constituting member and the external tooth constituting member; an eccentric member disposed in an eccentric space formed between the outer peripheral surface of the boss portion and the inner peripheral surface of the large diameter hole, in a state in which the internal teeth mesh with the external teeth; and a drive member configured to circumferentially rotate and drive the eccentric member in the eccentric space, wherein a whole of the drive member is formed by press forming of a metal plate material, and the drive member is provided with a cylindrical portion rotatably supported inside the boss portion, a flange portion integrally provided at a first end portion in an axial direction of the cylindrical portion so as to face one side surface side of the eccentric member, and a pushing portion integrally provided on an outer peripheral side of the flange portion so as to be configured to release a wedge effect of the eccentric member by circumferentially pushing the eccentric member, and wherein a wall portion is integrally formed on an inner peripheral surface of a second end portion in the axial direction of the cylindrical portion, and is formed with, in a middle thereof, an internal tooth portion meshing with an output shaft of a motor.

DETAILED DESCRIPTION

In the following, an embodiment of a seat reclining apparatus according to the present invention will be explained based on the figures.

Figure 1:
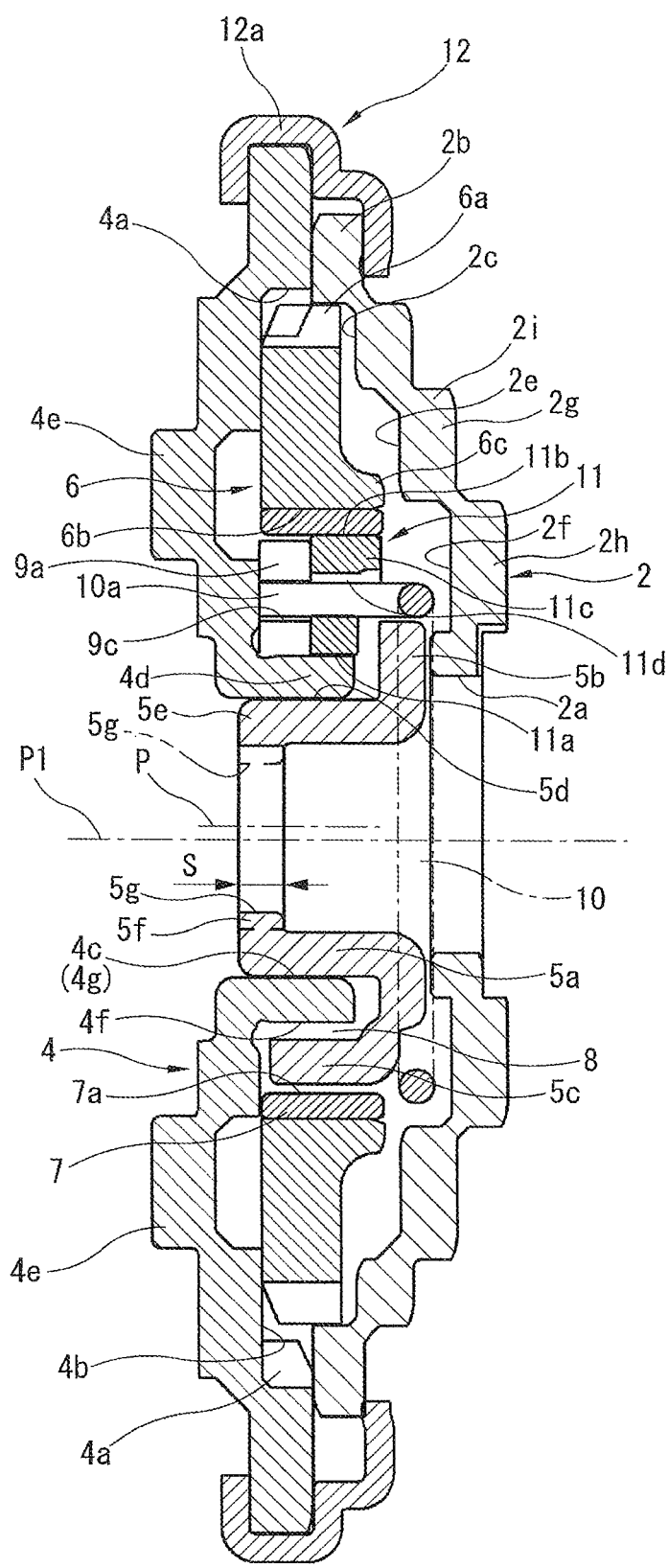
FIG. 1 is a main part sectional view of a seat reclining apparatus of an embodiment of the present invention.
Figure 2:
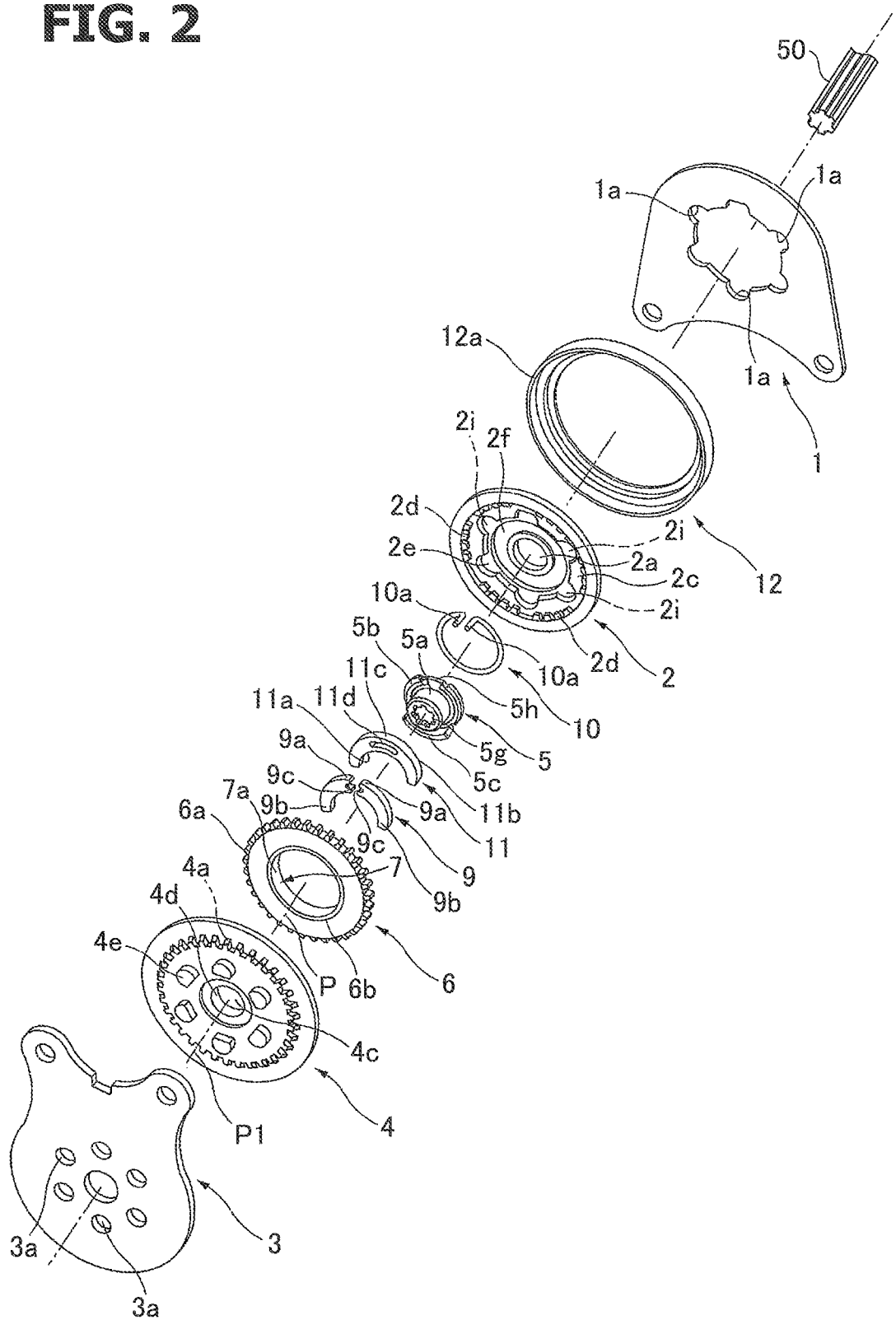
FIG. 2 is a perspective exploded view of a main component member of the seat reclining apparatus of the present embodiment.
Figure 3:
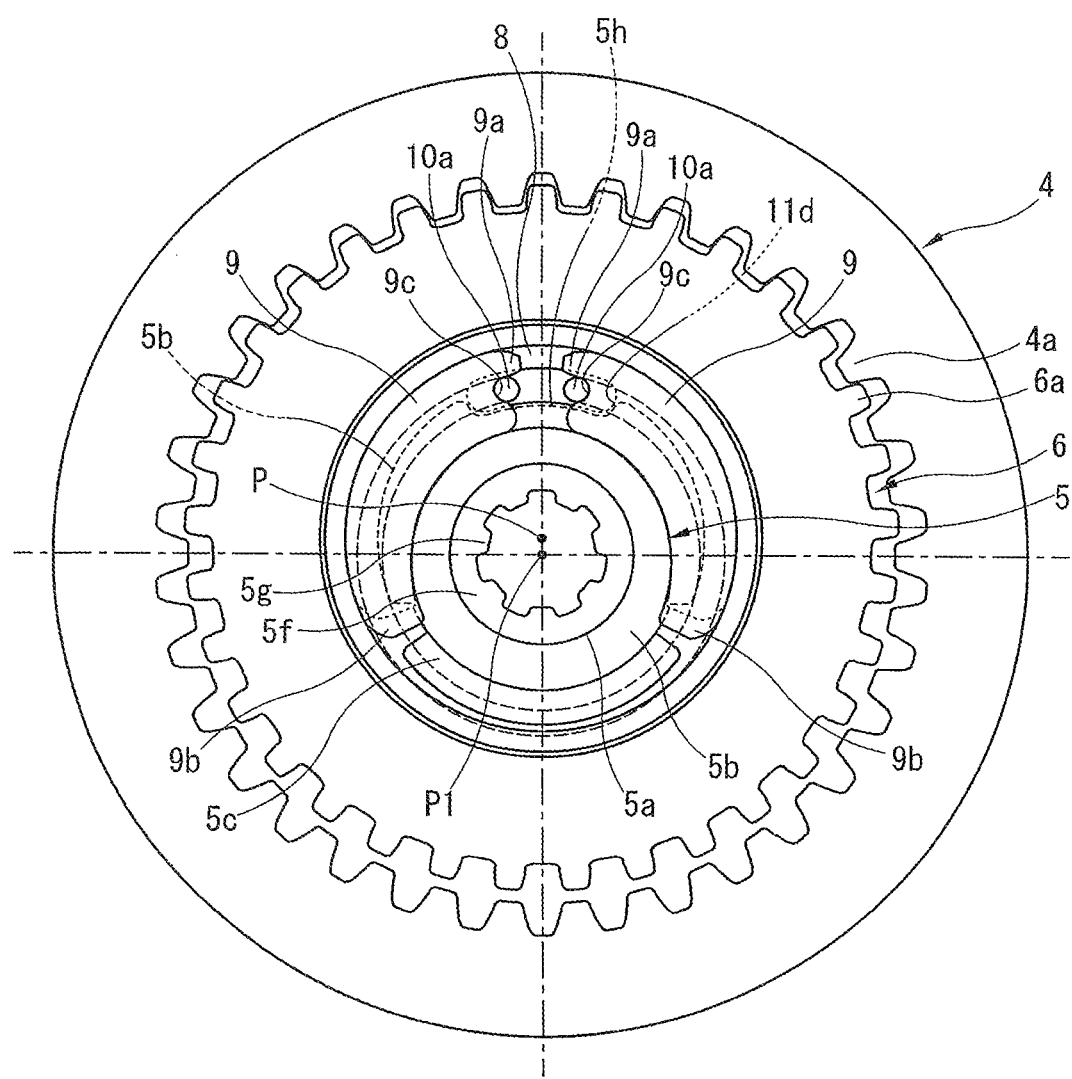
FIG. 3 is a figure showing a state in which internal teeth and external teeth of an internal tooth constituting member and an external tooth constituting member used in the present embodiment mesh with each other.

FIG. 1 is a main part sectional view of a seat reclining apparatus of an embodiment of the present invention, FIG. 2 is a perspective exploded view of a main component member of the seat reclining apparatus of the present embodiment, and FIG. 3 is a figure showing a state in which internal teeth and external teeth of an internal tooth constituting member and an external tooth constituting member used in the present embodiment mesh with each other.

As shown in FIG. 1 and FIG. 2, the seat reclining apparatus is provided with a lid member 2 coupled to a cushion side arm 1 provided to a seat cushion (not shown), an internal tooth constituting member 4 coupled to a back side arm 3 provided to a seat back (not shown), a drive bush 5 that is a drive member through which a drive shaft (not shown) that is an output shaft 50 rotatably driven by an electric motor (not shown) provided to the seat back side is inserted so as to be rotatably and integrally driven with the drive shaft, and an external tooth constituting member 6 integrally coupled to the lid member 2. When rotation drive force in a normal direction or a reverse direction is applied to the drive bush 5 by the electric motor, the internal tooth constituting member 4 is rotated with respect to the lid member 2 in the opposite direction of the rotation direction of the drive bush 5, while reducing the rotation speed thereof at a high reduction ratio.

As shown in FIG. 1 and FIG. 2, the lid member 2 is formed by half blanking by the press forming of an iron-based metal material so as to be formed in a disk shape, and an insertion hole 2a through which the output shaft 50 of the electric motor is inserted is formed through the middle of the lid member 2. In addition, a first circular arc-shaped recessed portion 2c is formed to the inner periphery of an annular outer peripheral portion 2b of the lid member 2. A fitting internal tooth portion 2d of the lid member 2 is formed intermittently on the internal peripheral surface of the first circular arc-shaped recessed portion 2c in the circumferential direction, and part of the after-mentioned external teeth 6a of the external tooth constituting member 6 is press-fitted thereto.

In addition, a second circular arc-shaped recessed portion 2e for accommodating the after-mentioned cylindrical projection portion 6c of the external tooth constituting member 6 is formed on the radially inner side of the first circular arc-shaped recessed portion 2c, and a third circular arc-shaped recessed portion 2f for accommodating the after-mentioned ring spring 10 is formed on the radially inner side of the second circular arc-shaped recessed portion 2e. A second circular arc-shaped projection portion 2g is formed on the back surface side of the second circular arc-shaped recessed portion 2e, and a third circular arc-shaped projection portion 2h is formed on the back surface side of the third circular arc-shaped recessed portion 2f. In addition, the second circular arc-shaped recessed portion 2e is provided with, at equal interval positions in the circumferential direction, a plurality of fitting projections 2i (in the present embodiment, six fitting projections) projecting radially outward. The fitting projections 2i are fitted to respective six fitting recessed portions 1a formed to the cushion side arm 1 by welding.

As shown in FIG. 1 and FIG. 2, the internal tooth constituting member 4 is made of an iron-based metal material, is formed in a disk shape, and is formed with an annular recessed portion 4b on the radially inner side on the lid member 2 side of the outer peripheral part of the internal tooth constituting member 4. The inner peripheral surface of the annular recessed portion 4b is formed with a plurality of internal teeth 4a formed by half blanking. In addition, a cylindrical boss portion 4d is integrally provided so as to axially extend from the hole edge on the lid member 2 side of a through hole 4c formed by penetrating the middle of the internal tooth constituting member 4. In addition, a plurality of projection portions 4e (in the present embodiment, six projection portions) projecting toward the back side arm 3 are provided, at equal interval positions in the circumferential direction, between the internal teeth 4a and the boss portion 4d of the internal tooth constituting member 4. The projection portions 4e are formed by embossing with press forming, are fitted to respective six fixing holes 3a formed in the back side arm 3, and then are fixed by welding.

The external tooth constituting member 6 is made of an iron-based metal material, is formed in a disc shape, and is formed with, on the outer peripheral surface thereof, a plurality of external teeth 6a. The right part in FIG. 1 of the external teeth 6a is press-fitted to the fitting internal tooth portions 2d of the lid member 2 so as to be integrated with the lid member 2, and the left part in FIG. 1 of the external teeth 6a engages with the internal teeth 4a of the internal tooth constituting member 4.

The number of teeth of the external teeth 6a of the external constituting member 6 is set so as to be smaller by one or two than the number of teeth of the internal teeth 4a of the internal tooth constituting member 4. Consequently, as shown in FIG. 3, the meshing of the internal teeth 4a of the internal tooth constituting member 4 and the external teeth 6a of the external tooth constituting member 6 is in a state in which a center P of the external tooth constituting member 6 is eccentric to a center P1 of the internal tooth constituting member 4, and the internal teeth 4a and the external teeth 6a mesh with each other at a part in the circumferential direction.

The external tooth constituting member 6 is formed with, in the middle thereof, a large diameter hole 6b concentric with the external teeth 6a, and a cylindrical projection portion 6c is integrally formed at the hole edge on the lid member 2 side of the large diameter hole 6b. The inner peripheral surface of the cylindrical projection portion 6c serves as part of the large diameter hole 6b.

A metal bearing 7 that is a ring-shaped sliding bearing is fitted and fixed to the inner peripheral surface of the large diameter hole 6b. The metal bearing 7 is formed such that the axial length of the metal bearing 7 is substantially the same as that of the large diameter hole 6b including the inner peripheral surface of the cylindrical projection portion 6c. In this way, since the axial length of the metal bearing 7 is set so as to be substantially the same as that of the large diameter hole 6b, the slide contact area of an inner peripheral surface 7a of the metal bearing 7 and an outer peripheral surface 11b of a guide plate 11 can be increased in order to reduce the surface pressure at the time of sliding.

The ring spring 10 is axially disposed between a flange portion 5b of the drive bush 5 and the inner surface of the lid member 2, and is provided with, at the respective distal end portions thereof facing each other, projection end portions 10a, 10a projecting toward wedge members 9, 9 side.

An eccentric space 8 is formed between the inner peripheral surface 7a of the metal bearing 7 and an outer peripheral surface 4f of the boss portion 4d of the internal tooth constituting member 4.

As shown in FIG. 3, a pair of wedge members 9, 9 that are eccentric members having base end portions 9a, 9a facing each other is disposed in the eccentric space 8. A pair of each of the wedge members 9, 9 is formed in a circular arc shape, and the thickness of the wedge members 9 and 9 is reduced from the base end portions 9a, 9a toward distal end portions 9b, 9b of the respective wedge members 9, 9. The distal end surfaces of the base end portions 9a, 9a are formed with respective semicircular spring lock grooves 9c, 9c.

In addition, as shown in FIG. 1 to FIG. 3, a pair of the wedge members 9, 9 is biased in the direction circumferentially separating from each other by the ring spring 10 that is a spring member having projection end portions 10a, 10a which are locked in the respective spring lock grooves 9c, 9c from the directions opposite to each other. That is, in the meshing of the external teeth 6a of the external tooth constituting member 6 and the internal teeth 4a of the internal tooth constituting member 4, a pair of the wedge member 9, 9 is biased in the direction circumferentially separating from each other by the spring force of the ring spring 10 in order to always maintain a state in which backlash is not present. By the wedge effect and the biasing force of the ring spring 10, the center distance (amount of eccentricity) between the external teeth 6a and the internal teeth 4a in the eccentric space 8 is increased, and the external tooth constituting member 6 is pushed up to the upper side in FIG. 3. Consequently, the external teeth 6a deeply engage with the internal teeth 4a, a state in which backlash is not present is made, and, between the boss portion 4d and the internal teeth 4a, a state is maintained in which a gap between the external tooth constituting member 6 and a pair of the wedge members 9, 9 is not present.

In addition, the guide plate 11 is arranged on one side surface side in the axial direction of the wedge members 9, 9, and in the eccentric space 8, the wedge members 9, 9 are arranged on the internal tooth constituting member 4 side and the guide plate 11 is arranged on the lid member 2 side.

The guide plate 11 is made of an iron-based metal material, and is formed in a substantially circular arc shape, such that an inner peripheral surface 11a of the guide plate 11 is formed to have substantially the same curvature radius as that of the outer peripheral surface 4f of the boss portion 4d. In addition, the outer peripheral surface lib of the guide plate 11 has substantially the same curvature radius as that of the inner peripheral surface 7a of the metal bearing 7. The guide plate 11 is movable in the eccentric space 8 in the circumferential direction while keeping the center distance (amount of eccentricity) between the external teeth 6a and the internal teeth 4a constant.

In addition, as shown in FIG. 1 and FIG. 2, the guide plate 11 is integrally provided with an arc-shaped projection portion 11c on one side surface on the lid member 2 side of the guide plate 11, and is formed with, by penetrating therethrough, an arc-shaped long hole 11d through which the projection end portions 10a, 10a of the ring spring 10 are inserted, at the middle position in the circumferential direction on the lower side of the projection portion 11c.

The drive bush 5 configured to push a pair of the wedge member 9, 9 in the circumferential direction so as to be circumferentially rotated is arranged between the guide plate 11 and the lid member 2.

Figure 4:
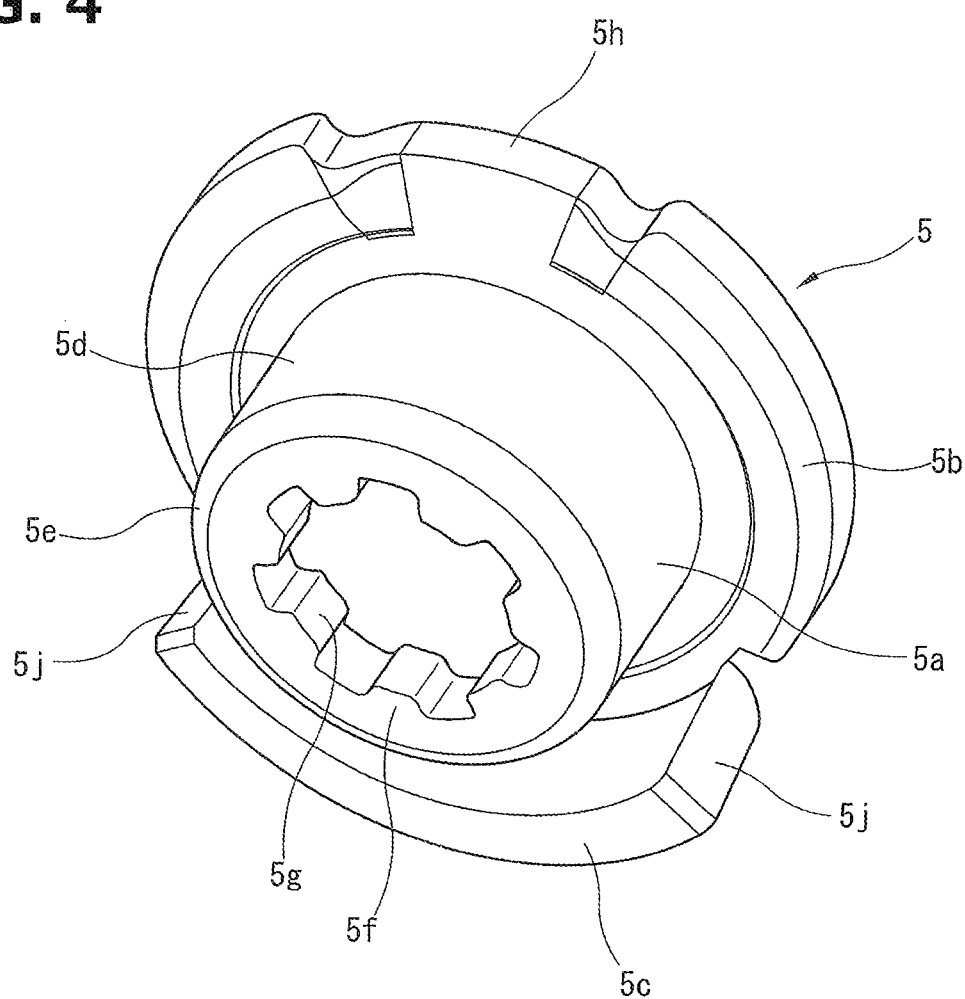
FIG. 4 is a perspective view of a drive bush used in the present embodiment when viewing the drive bush from the direction of the internal tooth constituting member.
Figure 5:
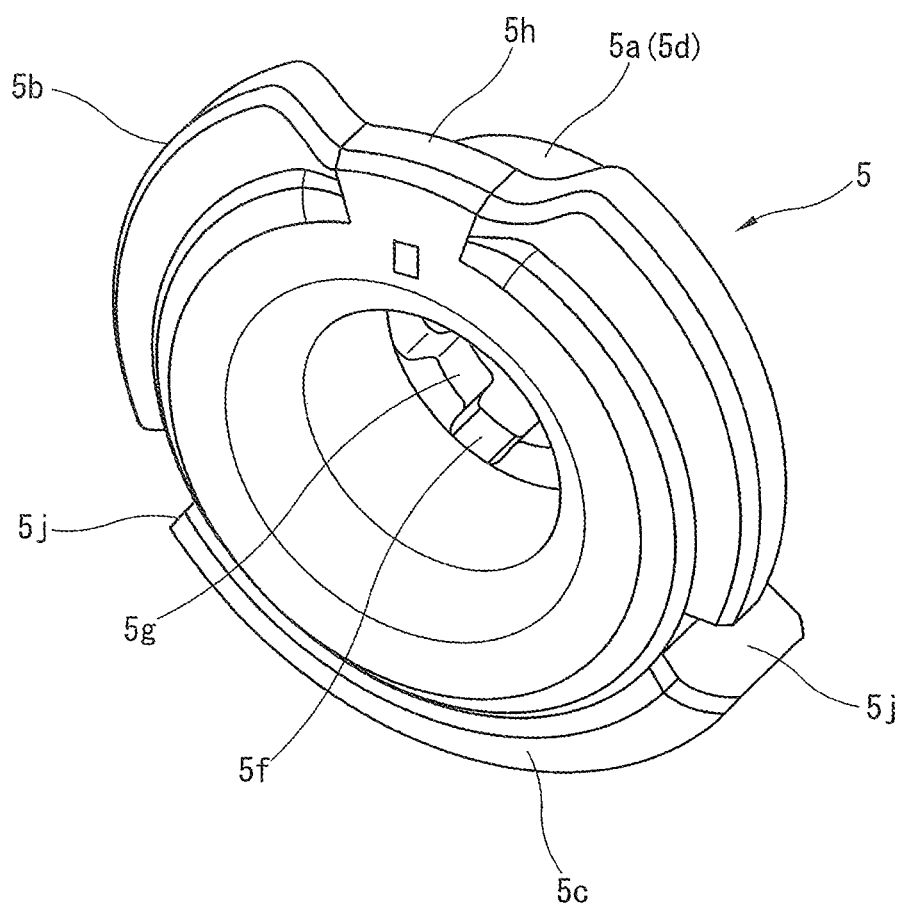
FIG. 5 is a perspective view of the drive bush when viewing the drive bush from the opposite direction of the internal tooth constituting member.
Figures 6A, 6B, 6C, 6D:
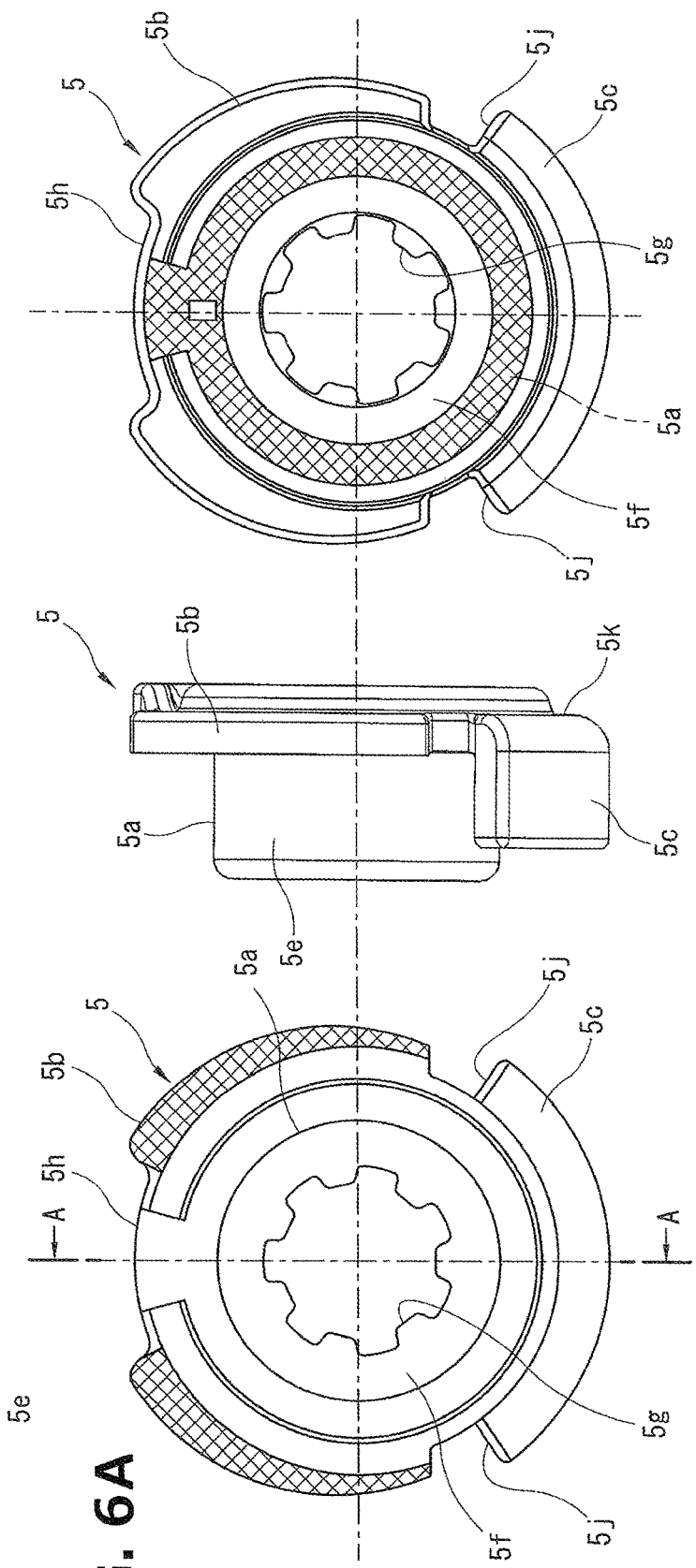
FIG. 6A is a front view of the drive bush.
FIG. 6B is a side view of the drive bush.
FIG. 6C is a plane view of the drive bush.
FIG. 6D is a back view of the drive bush.
Figure 7:
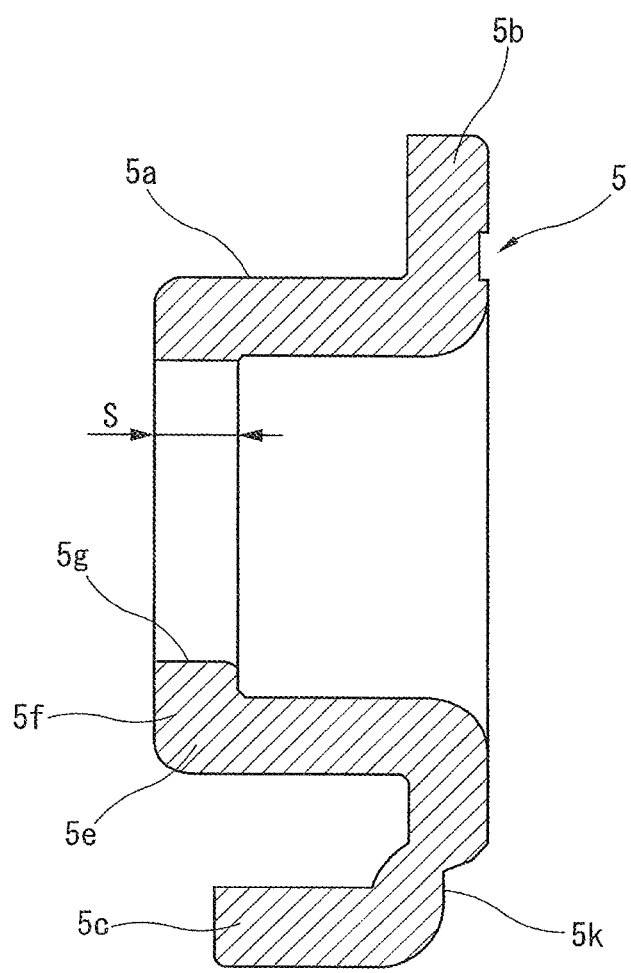
FIG. 7 is a sectional view of the drive bush which is taken along a line A-A of FIG. 6A.

FIG. 4 is a perspective view of the drive bush 5 used in the present embodiment when viewing the drive bush 5 from the direction of the internal tooth constituting member 4. FIG. 5 is a perspective view of the drive bush 5 when viewing the drive bush 5 from the opposite direction of the internal tooth constituting member 4. FIG. 6A is a front view of the drive bush 5, FIG. 6B is a side view of the drive bush 5, FIG. 6C is a plane view of the drive bush 5, and FIG. 6D is a back view of the drive bush 5. FIG. 7 is a sectional view of the drive bush 5 which is taken along a line A-A of FIG. 6A.

The whole of the drive bush 5 is formed by the press forming of an iron-based metal plate material having a predetermined thickness, and as shown in FIG. 1, and FIG. 4 to FIG. 7, the drive bush 5 is provided with a cylindrical portion 5a rotatably supported inside the boss portion 4d of the internal tooth constituting member 4, a flange portion 5b integrally provided to a first end portion in the axial direction of the cylindrical portion 5a so as to cover the side surfaces of the wedge members 9, 9, a pushing portion 5c integrally provided on the outer peripheral side of the flange portion 5b and configured to release a wedge effect by circumferentially pushing the wedge members 9, 9, and a wall portion 5f integrally formed on the inner peripheral surface of a second end portion in the axial direction of the cylindrical portion 5a.

The outer diameter of the outer peripheral surface 5d of the cylindrical portion 5a is formed to be slightly smaller than the inner diameter of the inner peripheral surface 4g of the boss portion 4d so as to be rotatable in the boss portion 4d, and the annular wall portion 5f is integrally provided on the inner peripheral surface of a distal end portion 5e that is the second end portion of the cylindrical portion 5a.

The wall portion 5f is formed with female spline teeth 5g formed as an annular internal tooth portion having a root surface, and the diameter of the root surface is slightly smaller than the inner diameter of the cylindrical portion 5a. The female spline teeth 5g mesh with the male spline teeth formed on the outer periphery of the drive shaft (not shown) connected to the output shaft 50 of the electric motor (not shown) in the axial direction so as to be spline-connected.

In addition, the wall portion 5f (female spline teeth 5g) is formed such that a thickness S in the axial direction is substantially the same as that of each of the cylindrical portion 5a and the flange portion 5b.

That is, at the time of the manufacturing, the cylindrical portion 5a, the flange portion 5b, the pushing portion 5c and the wall portion 5f of the drive bush 5 are formed by the press forming of an iron-based metal plate material so as to be axially drawn, and performing bending and pushing processing to it, thereby forming the drive bush 5 in a substantially crank shape in cross section.

After that, the wall portion 5f is formed by punching with press forming in the axial direction so as to form the female spline teeth 5g having a root surface with a diameter smaller than the inner diameter of the cylindrical portion 5a. Accordingly, the wall portion 5f (female spline teeth 5g) is set so as to have the thickness S which is the same as that of the cylindrical portion 5a and the like.

The flange portion 5b is formed in a ring shape, and is provided with, on the outer peripheral portion thereof, the pushing portion 5c. In addition, an arc-shaped groove 5h is formed at a position radially opposite to the pushing portion 5c. The arc-shaped groove 5h is formed at a position overlapping the arc-shaped long hole 11d of the guide plate 11, such that the projection end portions 10a, 10a of the ring spring 10 are fitted and inserted in the axial direction. As shown in FIG. 7, the flange portion 5b is formed with a ring-shaped recessed portion 5k on the outer peripheral portion thereof except the middle part of the arc-shaped groove 5h, so as to be offset toward the projection direction of the cylindrical portion 5a, and part of the ring part in the ring spring 10 is disposed in the recessed portion 5k.

The offset outer peripheral portion of the flange portion 5b is formed such that the part shown by being shaded in FIG. 6A of one side surface on the cylindrical portion 5a side of the flange portion 5b comes in contact with the guide plate 11. In addition, the inner side portion of the flange portion 5b is formed such that the part shown by being shaded in FIG. 6D of the other side surface on the opposite side of the cylindrical portion 5a comes in contact with the inner side surface adjacent to the hole edge of the insertion hole 2a of the lid member 2. With this, the flange portion 5b is possible to limit the movement in the axial direction of the guide plate 11 and a pair of the wedge members 9, 9 so as to suppress them from being slipped off.

The pushing portion 5c is integrally formed in an arc shape on the lower side in FIG. 6A of the flange portion 5b so as to axially project toward the eccentric space 8, such that, by the rotation drive force of the electric motor, end surfaces 5j, 5j in the circumferential direction of the pushing portion 5c circumferentially push the respective distal end portions of a pair of the wedge members 9, 9 in order to release the wedge effect.

In addition, as shown in FIG. 1 and FIG. 2, the outer peripheral portions of the lid member 2 and the internal tooth constituting member 4 are combined with each other by a connection ring 12 such that the lid member 2 and the internal tooth constituting member 4 are relatively rotatable, while being regulated in the axial direction, so as to axially overlap the constituting members of the outer tooth constituting member 6, the wedge members 9, 9 and the guide plate 11 arranged thereinside. As shown in FIG. 2, before being combined, the connection ring 12 is formed in a cylindrical shape whose outer peripheral end portion 12a extends in the axial direction, and, after being combined, as shown in FIG. 1, the outer peripheral end portion 12a is radially bent toward the center.

[Working Effect of Present Embodiment]

A basic action of the present embodiment will be explained. When the drive bush 5 is rotated in any direction by the rotation drive of the output shaft 50 of the electric motor, the pushing member 5c of the drive bush 5 circumferentially pushes the narrow distal end portion of one of a pair of the wedge members 9, 9. At this time, the ring spring 10 is slightly compressed, the other of the wedge members 9, 9 is slightly turned in the same direction as the rotation direction of the drive bush 5 by the compression, the engagement of the wedge member 9 is released, and then the wedge effect is eliminated.

After that, the guide plate 11 slides between the outer peripheral surface 4f of the boss portion 4d of the internal tooth constituting member 4 and the inner peripheral surface 7a of the metal bearing 7 of the external tooth constituting member 6 in the eccentric space 8, and while keeping an eccentric amount constant between the outer peripheral surface 4f and the inner peripheral surface 7a, a pair of the wedge members 9, 9 and the guide plate 11 are circumferentially turned inside the eccentric space 8. Consequently, the meshing part of the external teeth 6a of the external tooth constituting member 6 and the internal teeth 4a of the internal tooth constituting member 4 circumferentially moves. When the meshing part rotates once, since the number of teeth of the external teeth 6a is smaller by one or two than that of teeth of the internal teeth 4a, the internal tooth constituting member 4 which has the internal teeth 4a rotates in the opposite direction of the turning direction of the meshing part by the difference between the number of teeth of the external teeth 6a and the number of teeth of the internal teeth 4a. That is, when the drive bush 5 is rotated, with respect to the lid member 2 fixed to the cushion side arm 2, the internal tooth constituting member 4 rotates in the opposite direction of the rotation direction of the drive bush 5 together with the back side arm 3, while reducing the rotation speed thereof at a high reduction ratio.

Consequently, the seat back turns with respect to the seat cushion. When the rotation of the drive bush 5 stops, a pair of the wedge members 9, 9 bites in a wedge shape between the outer peripheral surface 4f of the boss portion 4d and the inner peripheral surface 7a of the metal bearing 7 by the biasing force of the ring spring 10, and is locked.

A pair of the wedge members 9, 9 bites between the outer peripheral surface 4f of the boss portion 4d and the inner peripheral surface 7a of the metal bearing 7 at the time of the locking, thereby suppressing the backlash between the external teeth 6a and the internal teeth 4a. The guide plate 11 allows to perform the smooth sliding between the outer peripheral surface 4f of the boss portion 4d and the inner peripheral surface 7a of the metal bearing 7 in a state in which the biting is released. With this, by dispersing functions to a pair of the wedge members 9, 9 and the guide plate 11, the turning of the seat back with respect to the seat cushion is smoothly performed.

In addition, in the present embodiment, since the drive bush 5 is formed from one metal plate material by press forming such that the cylindrical portion 5a, the wall portion 5f (including the female spline teeth 5g) of the cylindrical portion 5a and the flange portion 5b are formed to have substantially the same thickness, the thickness of the female spline teeth 5g is thinner than that of a conventional one, and thereby the drive bush 5 can be inexpensively formed while reducing useless shapes.

In particular, the drive bush 5 is formed by press forming without largely changing the thickness of a plate, as a metal material, having a thin thickness, and thereby a machining cost can be reduced.

In other words, in case where the plate thickness of the material of the female spline 5g is changed so as to be different from that of the flange portion 5b, it is necessary to increase the press tonnage of a press forming machine, and a machining cost increases. However, in the present embodiment, it is no necessary to change the plate thickness, thereby suppressing an increase in a machining cost.

Moreover, as mentioned above, the cylindrical portion 5a, the flange portion 5b, the pushing portion 5c and the wall portion 5f of the drive bush 5 are integrally formed by press forming such that the drive bush 5 is formed in a substantially crank shape in cross section. In addition, the female spline teeth 5g having a root surface diameter slightly smaller than the inner diameter of the cylindrical portion 5c is formed to the wall portion 5f by punching.

In this way, the whole of the drive bush 5 can be inexpensively manufactured from one metal plate material by only axial press forming. In particular, the cylindrical portion 5a, the flange portion 5b, the pushing portion 5c and the wall portion 5f are formed to have substantially the same thickness, and thereby a reduction in a machining cost can be achieved. In addition, the forming work of the female spline teeth 5g formed by axial punching also becomes easy.

Moreover, a pair of the wedge members 9, 9 is in a state of being fitted between the inner peripheral surface 7a of the metal bearing 7 and the outer peripheral surface 4f of the boss portion 4d forming the eccentric space 8, and the drive bush 5 circumferentially pushes and rotates one of the wedge members 9, 9 with the pushing portion 5c in the fitted state. In this case, a large frictional resistance is generated, and a large force is required for the action at the initial stage of the rotation.

However, in the present embodiment, since the female spline teeth 5g of the drive bush 5 which receive the rotation drive force of the electric motor are located at a position axially overlapping a pair of the wedge members 9, 9, a biased load causing the inclination of the drive bush 5 is not generated, and the rotational action becomes smooth. Consequently, a reduction in operation noise can be achieved.

As a seat reclining apparatus according to the present embodiment explained above, for example, following aspects are considered.

In one preferable aspect in the present invention, a seat reclining apparatus comprising: an internal tooth constituting member having, on an annular inner peripheral surface thereof, a plurality of internal teeth formed by half blanking in an axial direction thereof; an external tooth constituting member having, on an annular outer peripheral surface thereof, a plurality of external teeth which mesh with the internal teeth of the internal tooth constituting member, and whose number of teeth is smaller by one or two than that of teeth of the internal teeth; a cylindrical boss portion provided to one of the internal tooth constituting member and the external tooth constituting member; a large diameter hole having an inner peripheral surface which has an inner diameter larger than an outer diameter of an outer peripheral surface of the boss portion and into which the boss portion is inserted, the large diameter hole being provided to an other of the internal tooth constituting member and the external tooth constituting member; an eccentric member disposed in an eccentric space formed between the outer peripheral surface of the boss portion and the inner peripheral surface of the large diameter hole, in a state in which the internal teeth mesh with the external teeth; and a drive member configured to circumferentially rotate and drive the eccentric member in the eccentric space, wherein a whole of the drive member is formed by press forming of a metal plate material, and the drive member is provided with a cylindrical portion rotatably supported inside the boss portion, a flange portion integrally provided at a first end portion in an axial direction of the cylindrical portion so as to face one side surface side of the eccentric member, and a pushing portion integrally provided on an outer peripheral side of the flange portion so as to be configured to release a wedge effect of the eccentric member by circumferentially pushing the eccentric member, and wherein a wall portion is integrally formed on an inner peripheral surface of a second end portion in the axial direction of the cylindrical portion, and is formed with, in a middle thereof, an internal tooth portion meshing with an output shaft of a motor.

According to this configuration of the invention, since the drive member is formed by press forming from a metal plate material, and the cylindrical portion, the flange portion, the pushing portion and the wall portion are integrally continuously formed, the thickness of the internal tooth portion provided to the wall portion is thin as compared with a conventional one, and thereby the drive member can be inexpensively formed while reducing useless shapes.

In particular, since the wall portion (internal tooth portion) and the flange portion are formed to the respective both end portions of the cylindrical portion, the bush member can be formed by press forming without changing the thickness of one thin metal plate material, and thereby a machining cost can be reduced.

In another preferable aspect, the wall portion, the cylindrical portion, the flange portion and the pushing portion of the drive member are integrally formed by press forming of a metal plate material such that the drive member has a substantially crank shape in cross section, and the internal tooth portion formed to the wall portion has a root surface having a diameter smaller than an inner diameter of the cylindrical portion.

According to this configuration of the invention, since the whole drive member is integrally formed in a substantially crank shape in cross section by press forming from one metal plate material, the drive member can be compactly formed without forming useless arc shapes. In addition, the forming work of the internal tooth portion formed in the middle of the wall portion by punching becomes easy, it becomes possible to form the internal tooth portion so as to have a root surface diameter slightly smaller than the inner diameter of the cylindrical portion, and thereby the size of the drive member can be reduced.

In another preferable aspect, the cylindrical portion, the flange portion and the wall portion including the internal tooth portion have substantially the same thickness.

In another preferable aspect, the eccentric member is composed of a pair of wedge members circumferentially arranged in the eccentric space, and the internal tooth portion of the drive member is formed at a position overlapping a pair of the wedge members in the axial direction of the cylindrical portion.

According to this configuration, a pair of the wedge members is in a state of being fitted between the inner peripheral surface of the large diameter hole and the outer peripheral surface of the boss portion forming the eccentric space, and the drive member circumferentially pushes one of the wedge members with the pushing portion in the wedged state, and with this, the other of the wedge members rotates in the same direction. In this case, a large frictional resistance is generated, and a large force is required for the action at the initial stage of the rotation. However, in the present invention, since the internal tooth portion of the drive member receiving the rotation drive force of the motor is located at a position axially overlapping a pair of the wedge members, a biased load causing the inclination of the drive bush is not generated, and the rotation action becomes smooth. Consequently, a reduction in operation noise can be achieved.

In another preferable aspect, in a method for manufacturing the seat reclining apparatus, the method includes: forming the cylindrical portion, the wall portion, the flange portion and the pushing portion of the drive member by performing press forming of an iron-based metal plate material so as to be axially drawn, and performing bending and pushing processing to it, such that the drive member has a substantially crank shape in cross section; and forming the internal tooth portion to the wall portion by punching in the axial direction.

Although the present invention has been described with reference to the present embodiment and its variations, the present embodiment and its variations are intended to facilitate understanding of the present invention and are not intended to limit the present invention thereto. Various changes and modifications may be made to the present embodiment and its variations without departing from the scope of the present invention. The present invention includes equivalents thereof.

The entire contents of Japanese Patent Application 2020-181004 filed Oct. 29, 2020 is incorporated herein by reference.

The invention claimed is:

1. A seat reclining apparatus comprising:
an internal tooth constituting member having, on an annular inner peripheral surface thereof, a plurality of internal teeth formed by half blanking in an axial direction thereof;
an external tooth constituting member having, on an annular outer peripheral surface thereof, a plurality of external teeth which mesh with the internal teeth of the internal tooth constituting member, and whose number of teeth is smaller by one or two than that of teeth of the internal teeth;
a cylindrical boss portion provided to one of the internal tooth constituting member and the external tooth constituting member;
a large diameter hole having an inner peripheral surface which has an inner diameter larger than an outer diameter of an outer peripheral surface of the boss portion and into which the boss portion is inserted, the large diameter hole being provided to an other of the internal tooth constituting member and the external tooth constituting member;
an eccentric member disposed in an eccentric space formed between the outer peripheral surface of the boss portion and the inner peripheral surface of the large diameter hole, in a state in which the internal teeth mesh with the external teeth; and
a drive member configured to circumferentially rotate and drive the eccentric member in the eccentric space,
wherein a whole of the drive member is formed by press forming of a metal plate material, and the drive member is provided with a cylindrical portion rotatably supported inside the boss portion, a flange portion integrally provided at a first end portion in an axial direction of the cylindrical portion so as to face one side surface side of the eccentric member, and a pushing portion integrally provided on an outer peripheral side of the flange portion so as to be configured to release a wedge effect of the eccentric member by circumferentially pushing the eccentric member,
wherein a wall portion is integrally formed on an inner peripheral surface of a second end portion in the axial direction of the cylindrical portion, and is formed with, in a middle thereof, an internal tooth portion meshing with an output shaft of a motor, and
wherein the cylindrical portion, the flange portion and the wall portion including the internal tooth portion have substantially a same thickness.

2. The seat reclining apparatus according to claim 1, wherein the wall portion, the cylindrical portion, the flange portion and the pushing portion of the drive member are integrally formed by press forming of a metal plate material such that the drive member has a substantially crank shape in cross section, and the internal tooth portion formed to the wall portion has a root surface having a diameter smaller than an inner diameter of the cylindrical portion.

3. The seat reclining apparatus according to claim 1, wherein the eccentric member is composed of a pair of wedge members circumferentially arranged in the eccentric space, and
wherein the internal tooth portion of the drive member is formed at a position overlapping a pair of the wedge members in the axial direction of the cylindrical portion.

4. A method for manufacturing a seat reclining apparatus, the seat reclining apparatus comprising:
an internal tooth constituting member having, on an annular inner peripheral surface thereof, a plurality of internal teeth formed by half blanking in an axial direction thereof;
an external tooth constituting member having, on an annular outer peripheral surface thereof, a plurality of external teeth which mesh with the internal teeth of the internal tooth constituting member, and whose number of teeth is smaller by one or two than that of teeth of the internal teeth;
a cylindrical boss portion provided to one of the internal tooth constituting member and the external tooth constituting member;
a large diameter hole having an inner peripheral surface which has an inner diameter larger than an outer diameter of an outer peripheral surface of the boss portion and into which the boss portion is inserted, the large diameter hole being provided to an other of the internal tooth constituting member and the external tooth constituting member;
an eccentric member disposed in an eccentric space formed between the outer peripheral surface of the boss portion and the inner peripheral surface of the large diameter hole, in a state in which the internal teeth mesh with the external teeth; and
a drive member configured to circumferentially rotate and drive the eccentric member in the eccentric space,
wherein a whole of the drive member is formed by press forming of a metal plate material, and the drive member is provided with a cylindrical portion rotatably supported inside the boss portion, a flange portion integrally provided at a first end portion in an axial direction of the cylindrical portion so as to face one side surface side of the eccentric member, and a pushing portion integrally provided on an outer peripheral side of the flange portion so as to be configured to release a wedge effect of the eccentric member by circumferentially pushing the eccentric member,
wherein a wall portion is integrally formed on an inner peripheral surface of a second end portion in the axial direction of the cylindrical portion, and is formed with, in a middle thereof, an internal tooth portion meshing with an output shaft of a motor, and
wherein the cylindrical portion, the flange portion and the wall portion including the internal tooth portion have substantially a same thickness, the method comprising:
forming the cylindrical portion, the wall portion, the flange portion and the pushing portion of the drive member by performing press forming of an iron-based metal plate material so as to be axially drawn, and performing bending and pushing processing to it, such that the drive member has a substantially crank shape in cross section; and
forming the internal tooth portion to the wall portion by punching in the axial direction.

* * * * *